(12) United States Patent
Barsness et al.

(10) Patent No.: US 8,868,623 B2
(45) Date of Patent: Oct. 21, 2014

(54) ENHANCED GARBAGE COLLECTION IN A MULTI-NODE ENVIRONMENT

(75) Inventors: Eric Lawrence Barsness, Pine Island, MN (US); David L. Darrington, Rochester, MN (US); Amanda Peters, Rochester, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1851 days.

(21) Appl. No.: 11/928,768

(22) Filed: Oct. 30, 2007

(65) Prior Publication Data

US 2009/0112953 A1    Apr. 30, 2009

(51) Int. Cl.
G06F 12/00      (2006.01)
G06F 17/30      (2006.01)
G06F 12/02      (2006.01)
G06F 17/00      (2006.01)

(52) U.S. Cl.
CPC .................. *G06F 12/0269* (2013.01)
USPC .......................................... 707/813; 707/819

(58) Field of Classification Search
USPC .......................................... 707/999.206, 813
See application file for complete search history.

(56) References Cited

U.S. PATENT DOCUMENTS

| | | | | |
|---|---|---|---|---|
| 5,031,090 A | * | 7/1991 | Banach et al. | 709/202 |
| 5,819,299 A | * | 10/1998 | Bejar | 707/999.206 |
| 6,052,699 A | * | 4/2000 | Huelsbergen et al. | 707/999.206 |
| 6,199,075 B1 | * | 3/2001 | Ungar et al. | 707/999.206 |
| 6,366,914 B1 | * | 4/2002 | Stern | 707/999.01 |
| 6,526,422 B1 | * | 2/2003 | Flood et al. | 707/999.206 |
| 6,611,858 B1 | * | 8/2003 | Aravamudan et al. | 707/999.1 |
| 2001/0044856 A1 | * | 11/2001 | Agesen et al. | 709/315 |
| 2002/0165964 A1 | * | 11/2002 | Chen et al. | 709/226 |
| 2003/0212719 A1 | * | 11/2003 | Yasuda et al. | 707/206 |
| 2004/0010510 A1 | * | 1/2004 | Hotti | 707/103 R |
| 2004/0122874 A1 | * | 6/2004 | Garthwaite | 707/206 |
| 2006/0053216 A1 | * | 3/2006 | Deokar et al. | 709/223 |
| 2006/0143178 A1 | * | 6/2006 | Chan et al. | 707/9 |
| 2006/0230087 A1 | * | 10/2006 | Andreasson | 707/206 |
| 2007/0022129 A1 | * | 1/2007 | Bahar et al. | 707/100 |
| 2008/0059747 A1 | * | 3/2008 | Burckart et al. | 711/167 |
| 2008/0163015 A1 | * | 7/2008 | Kagan et al. | 714/724 |

OTHER PUBLICATIONS

Kenjiro Taura , Akinori Yonezawa, An effective garbage collection strategy for parallel programming languages on large scale distributed-memory machines, Proceedings of the sixth ACM SIGPLAN symposium on Principles and practice of parallel programming, p. 264-275, Jun. 18-21, 1997, Las Vegas, Nevada, United States.*

* cited by examiner

*Primary Examiner* — Kannan Shanmugasundaram
(74) *Attorney, Agent, or Firm* — Patterson & Sheridan LLP (57) ABSTRACT

Embodiments of the invention enhance a garbage collection process running on a parallel system or distributed computing environment. Using a garbage collector in such an environment allows a more in-depth analysis to be performed than is possible on other systems. This is because the number of compute nodes present in many parallel systems, and the connections between them, allows the overhead of doing advanced analysis to be spread across the nodes and the results of that analysis to be shared among the nodes.

18 Claims, 7 Drawing Sheets

ENHANCED GARBAGE COLLECTION IN A MULTI-NODE ENVIRONMENT

BACKGROUND OF THE INVENTION

Embodiments of the invention relate to memory management using a garbage collector. More specifically, embodiments of the invention related to a method for enhanced garbage collection in a multi-node environment.

DESCRIPTION OF THE RELATED ART

A garbage collector is software that runs concurrently with object-oriented applications to free up memory as applications release objects. Garbage collectors typically work in cycles whereby a cycle includes analyzing the objects in an application to determine whether the memory assigned to a given object may be freed.

Garbage collectors free programmers from having to expressly free memory allocated to an object. This greatly reduces the occurrence of memory leaks. Memory leaks are a serious problem for object-oriented application, development.

Nevertheless, running a garbage collector does incur some processing overhead. Accordingly, garbage collectors have evolved to reduce overhead required to perform the garbage collection process. One concept that has developed is to distinguish objects as either "long-lived" or "short-lived." Short-lived objects are those that are created, used briefly, and then no longer needed. These objects are often created in a method, possibly even in a loop, and are not used outside of the method or loop. Once the method or loop completes, the object can be collected, i.e., the memory assigned to the object may be freed. Long-lived objects, on the other hand, are used for a relatively longer period of time. In fact, some long-lived objects persist until the object-oriented application ends.

Logically separating objects involves keeping short-lived objects in object "nurseries," and long-lived objects in "tenured spaces." Keeping objects logically separated allows the garbage collector to more aggressively check the objects in the nursery since they are more likely to be short-lived, and only periodically analyze the objects in the tenured space since they are more likely to be long-lived.

Generally, object-oriented applications place newly created objects in the object nurseries. To determine whether an object is long-lived, garbage collectors typically track objects from cycle to cycle. Once an object has "survived" a number of collection cycles, the object may be moved from the nursery into the tenured space. The garbage collector looks at objects in the tenured space less frequently than those in the nursery, thereby reducing the number of total objects that are analyzed during each garbage collection cycle.

SUMMARY OF THE INVENTION

One embodiment of the invention provides a method for performing a garbage collection cycle on a parallel computing system having a plurality of compute nodes. The method may generally include identifying an object space in a memory of a first compute node. The object space may store one or more objects allocated by a computing job running on the first compute node. The method may further include evaluating each object in the object space to determine whether the memory allocated to each respective object is eligible to be collected. Upon determining that the memory allocated to a given object is eligible to be collected, the given object may be removed from the object space and memory allocated to the given object may be returned to a pool. The method may further include determining a set of garbage collection statistics associated with at least one evaluated object in the object space and transmitting the set of garbage collection statistics to a master garbage collector running on a second compute node of the parallel computing system.

Another embodiment of the invention includes a computer-readable storage medium containing a program which, when executed, performs an operation of performing a garbage collection cycle on a parallel computing system having a plurality of compute nodes. The operation may generally include identifying an object space in a memory of a first compute node, where the object space stores one or more objects allocated by a computing job running on the first compute node. The operation may further include evaluating each object in the object space to determine whether the memory allocated to each respective object is eligible to be collected. Upon determining that the memory allocated to a given object is eligible to be collected, the given object may be removed from the object space and memory allocated to the given object may be returned to a pool. The operation may further include determining a set of garbage collection statistics associated with at least one evaluated object in the object space and transmitting the set of garbage collection statistics to a master garbage collector running on a second compute node of the parallel computing system.

Yet another embodiment of the invention includes a parallel computing system having a plurality of compute nodes, each having at least a processor and a memory. The plurality of compute nodes may be configured to execute a parallel computing task and a garbage collector running on a first compute node may be configured to identify an object space storing objects in a memory of the first compute node. The object space stores one or more objects allocated by the parallel computing task job running on the first compute node. The garbage collector running on the first node may be further configured to evaluate each object in the object space to determine whether the memory allocated to each respective object is eligible to be collected. Upon determining that the memory allocated to a given object is eligible to be collected, the given object may be removed from the object space and memory allocated to the given object may be returned to a pool. The garbage collector running on the first node may be further configured to determine a set of garbage collection statistics associated with at least one evaluated object in the object space and transmit the set of garbage collection statistics to a master garbage collector running on a second compute node of the parallel computing system.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Embodiments of the invention are generally directed to a method and apparatus for enhanced garbage collection in a multi-node environment. That is, embodiments of the invention are generally directed to a method for garbage collection on a parallel system having a plurality of compute nodes. Using a garbage collector in an environment with multiple compute nodes allows a more in-depth analysis to be performed than is possible on other systems. This is because the sheer number of compute nodes present in many parallel systems, and the connections between them, allows the overhead of doing advanced analysis to be spread across the nodes and the results of that analysis to be shared among the nodes. In one embodiment, using multiple nodes for garbage collection includes sharing duties among nodes, reducing overhead such that complex analyses may improve garbage collection efficiency.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 1:
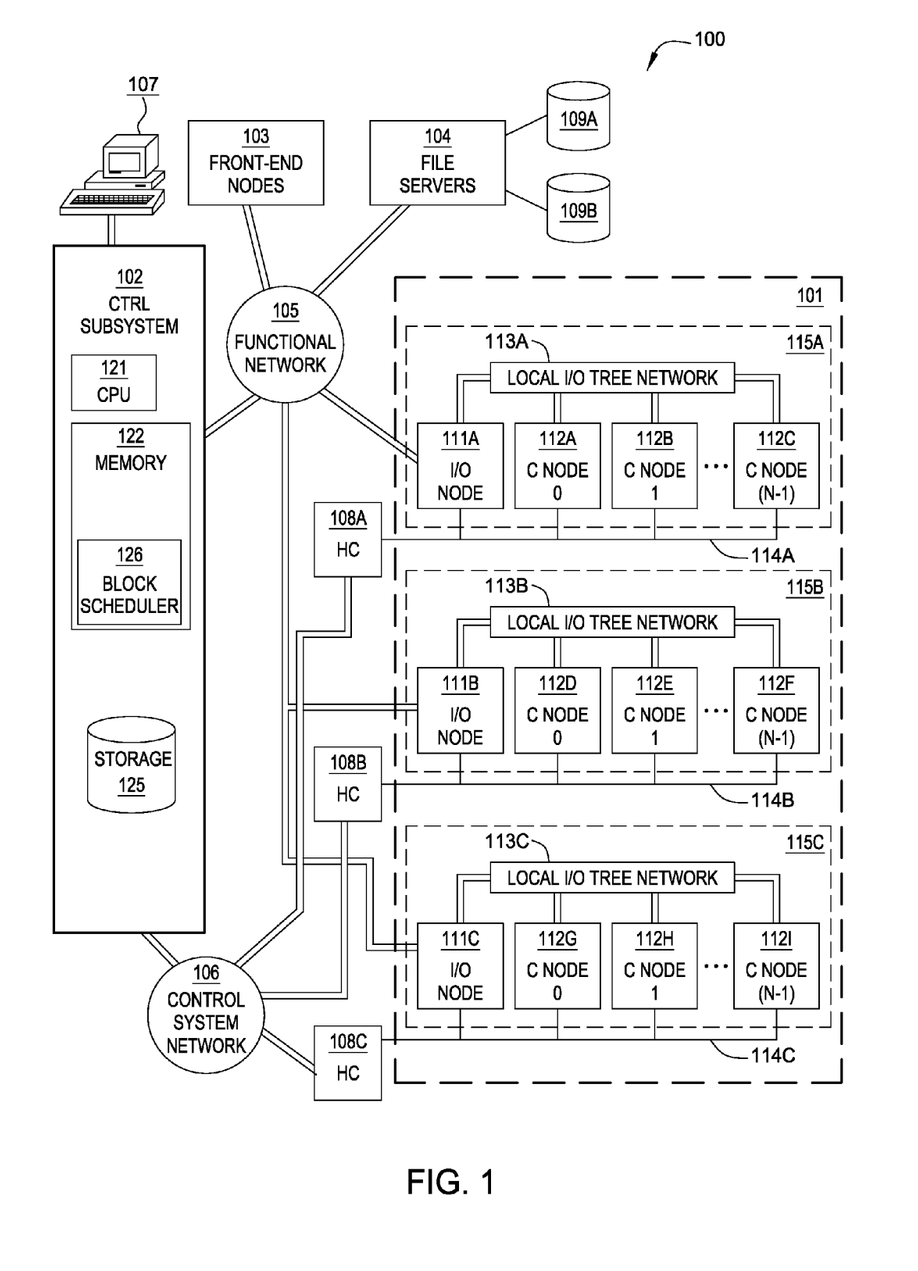
FIG. 1 is a high-level block diagram of components of a parallel computer system, according to one embodiment of the present invention.

FIG. 1 is a high-level block diagram of components of parallel computer system 100, according to one embodiment of the present invention. Illustratively, computer system 100 shows the high-level architecture of an IBM Blue Gene® computer system, it being understood that other parallel computer systems could be used, and the description of a preferred embodiment herein is not intended to limit the present invention.

As shown, computer system 100 includes a compute core 101 having a number of compute nodes arranged in a regular array or matrix, which perform the useful work performed by system 100. The operation of computer system 100, including compute core 101, may be controlled by control subsystem 102. Various additional processors in front-end nodes 103 may perform auxiliary data processing functions, and file servers 104 provide an interface to data storage devices such as disk based storage 109A, 109B or other I/O (not shown). Functional network 105 provides the primary data communication path among compute core 101 and other system components. For example, data stored in storage devices attached to file servers 104 is loaded and stored to other system components through functional network 105.

Also as shown, compute core 101 includes I/O nodes 111A-C and compute nodes 112A-I. Compute nodes 112 provide the processing capacity of parallel system 100, and are configured to execute applications written for parallel processing. I/O nodes 111 handle I/O operations on behalf of compute nodes 112. Each I/O node 111 may include a processor and interface hardware that handles I/O operations for a set of N compute nodes 112, the I/O node and its respective set of N compute nodes are referred to as a Pset. Compute core 101 contains M Psets 115A-C, each including a single I/O node 111 and N compute nodes 112, for a total of M×N compute nodes 112. The product M×N can be very large. For example, in one implementation M=1024 (1 K) and N=64, for a total of 64 K compute nodes.

In general, application programming code and other data input required by compute core 101 to execute user applications, as well as data output produced by the compute core 101, is communicated over functional network 105. The compute nodes within a Pset 115 communicate with the corresponding I/O node over a corresponding local I/O tree network 113A-C. The I/O nodes, in turn, are connected to functional network 105, over which they communicate with I/O devices attached to file servers 104, or with other system components. Thus, the local I/O tree networks 113 may be viewed logically as extensions of functional network 105, and like functional network 105 are used for data I/O, although they are physically separated from functional network 105.

Control subsystem 102 directs the operation of the compute nodes 112 in compute core 101. Control subsystem 102 is a computer that includes a processor (or processors) 121, internal memory 122 local storage 125, and block scheduler 126. An attached console 107 may be used by a system administrator or similar person. Control subsystem 102 may also include an internal database which maintains state information for the compute nodes in core 101, and an application which may be configured to, among other things, control the allocation of hardware in compute core 101, direct the loading of data on compute nodes 112, and perform diagnostic and maintenance functions. Block scheduler 126 may be configured to assign compute nodes 112 of compute core 101 to a block used to carry out a given user request or job. The database on local storage 125 may be used to record which computing resources (e.g., compute nodes 112) of the parallel system are allocated to a given block and which computing resources are available to perform computing tasks.

In one embodiment, performing a computing task may require garbage collection functionality. That is, for object-oriented applications, it may be necessary to proactively free memory while the task is running. Accordingly, a garbage collector may run concurrently with an application to free memory as the application releases objects, i.e., to return memory allocated to an object no longer referenced by the application to an available pool from which memory is allocated.

Control subsystem 102 communicates control and state information with the nodes of compute core 101 over control system network 106. Network 106 is coupled to a set of hardware controllers 108A-C. Each hardware controller communicates with the nodes of a respective Pset 115 over a corresponding local hardware control network 114A-C. The hardware controllers 108 and local hardware control networks 114 are logically an extension of control system network 106, although physically separate.

In addition to control subsystem 102, front-end nodes 103 provide computer systems used to perform auxiliary functions which, for efficiency or otherwise, are best performed outside compute core 101. Functions which involve substantial I/O operations are generally performed in the front-end nodes. For example, interactive data input, application code editing, or other user interface functions are generally handled by front-end nodes 103, as is application code compilation. Front-end nodes 103 are connected to functional network 105 and may communicate with file servers 104.

Figure 2:
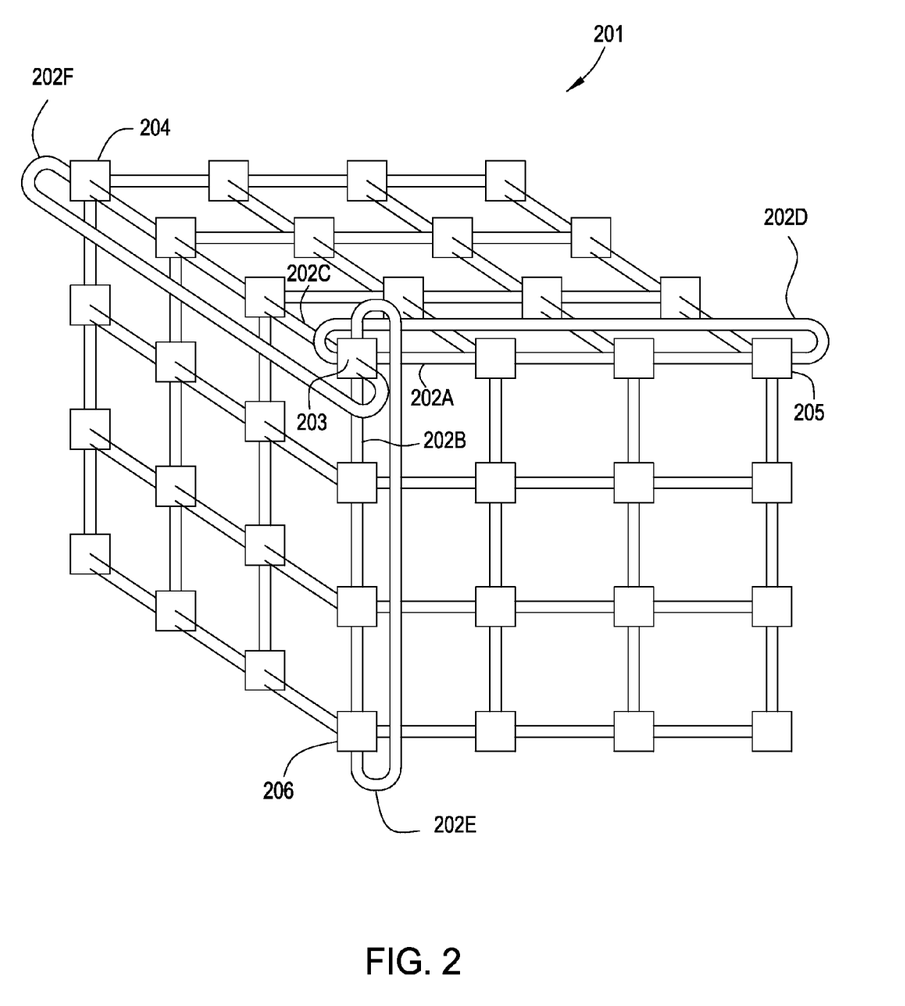
FIG. 2 is a conceptual illustration of a three-dimensional torus network of the system of FIG. 1, according to one embodiment of the invention.

As stated, in a massively parallel computer system 100, compute nodes 112 may be logically arranged in a three-dimensional torus, where each compute node 112 may be identified using an x, y and z coordinate. FIG. 2 is a conceptual illustration of a three-dimensional torus network of system 100, according to one embodiment of the invention. More specifically, FIG. 2 illustrates a 4×4×4 torus 201 of compute nodes, in which the interior nodes are omitted for clarity.

Although FIG. 2 shows a 4×4×4 torus having 64 nodes, it will be understood that the actual number of compute nodes in a parallel computing system is typically much larger. For example, a complete Blue Gene/L system includes 65,536 compute nodes. Each compute node 112 in torus 201 includes a set of six node-to-node communication links 202A-F which allows each compute nodes in torus 201 to communicate with its six immediate neighbors, two nodes in each of the x, y and z coordinate dimensions.

As used herein, the term "torus" includes any regular pattern of nodes and inter-nodal data communications paths in more than one dimension, such that each node has a defined set of neighbors, and for any given node, it is possible to determine the set of neighbors of that node. A "neighbor" of a given node is any node which is linked to the given node by a direct inter-nodal data communications path. That is, a path which does not have to traverse another node. The compute nodes may be linked in a three-dimensional torus 201, as shown in FIG. 2, but may also be configured to have more or fewer dimensions. Also, it is not necessarily the case that a given node's neighbors are the physically closest nodes to the given node, although it is generally desirable to arrange the nodes in such a manner, insofar as possible.

In one embodiment, the compute nodes in any one of the x, y, or z dimensions form a torus in that dimension because the point-to-point communication links logically wrap around. For example, this is represented in FIG. 2 by links 202D, 202E, and 202F which wrap around from compute node 203 to other end of compute core 201 in each of the x, y and z dimensions. Thus, although node 203 appears to be at a "corner" of the torus, node-to-node links 202D, 202E, and 202F link node 203 to nodes 204, 205, and 206, in the x, y, and Z dimensions of torus 201.

Figure 3:
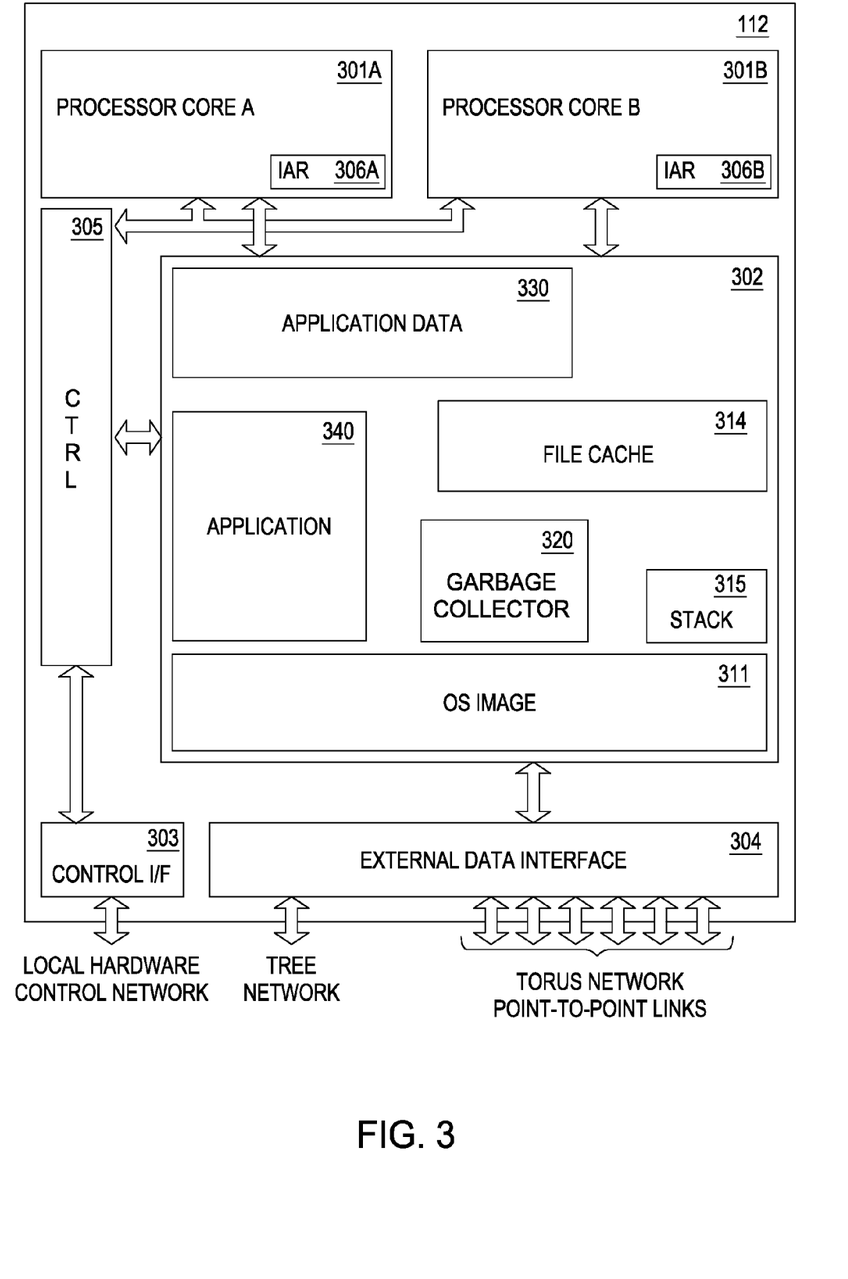
FIG. 3 is a high-level diagram of a compute node of the system of FIG. 1, according to one embodiment of the invention.

FIG. 3 is a high-level diagram of a compute node 112 of the system 100 of FIG. 1, according to one embodiment of the invention. As shown, compute node 112 includes processor cores 301A and 301B, and also includes memory 302 used by both processor cores 301; an external control interface 303 which is coupled to local hardware control network 114; an external data communications interface 304 which is coupled to the corresponding local I/O tree network 113, and the corresponding six node-to-node links 202 of the torus network 201; and monitoring and control logic 305 which receives and responds to control commands received through external control interface 303. Monitoring and control logic 305 may access processor cores 301 and locations in memory 302 on behalf of control subsystem 102 to read (or in some cases alter) the operational state of node 112. In one embodiment, each node 112 may be physically implemented as a single, discrete integrated circuit chip.

As described, functional network 105 may service many I/O nodes, and each I/O node is shared by multiple compute nodes 112. Thus, it is apparent that the I/O resources of parallel system 100 are relatively sparse when compared to computing resources. Although it is a general purpose computing machine, parallel system 100 is designed for maximum efficiency in applications which are computationally intense.

As shown in FIG. 3, memory 302 stores an operating system image 311, an application code image 340, and user application data structures 330 as required. Some portion of memory 302 may be allocated as a file cache 314, i.e., a cache of data read from or to be written to an I/O file. Operating system image 311 provides a copy of a simplified-function operating system running on compute node 112, generally refereed to as a compute node kernel. Operating system image 311 may include a minimal set of functions required to support operation of the compute node 112.

Application code image 340 represents a copy of the application code being executed by compute node 112. Application code image 340 may include a copy of a computer program and data submitted for execution on system 100. In one embodiment, a group of compute nodes may be assigned to a block, where each node in the block executes the same application code image 340. The application image on each node may be configured to communicate with the other nodes of that block in performing the computing job. For example, many computing tasks may be performed in parallel, and each node of the block participates in performing a collective task. Using parallel processing techniques to run on a block of hundreds, thousands, or even tens of thousands of compute nodes allows otherwise intractable computing tasks to be performed. Memory 302 may also include a call-return stack 315 for storing the states of procedures which must be returned to, which is shown separate from application code image 340, although in may be considered part of application code state data.

Additionally, memory 302 may include a garbage collector 320. In one embodiment, the garbage collector 320 frees memory within application code image 340. The garbage collector 320 may track of which types of objects included in application 340 are likely to be short lived versus long lived. Note, recall that an instance of garbage collector 320 may be executing on each node in a block running a given application 340. Accordingly, in one embodiment, the overhead of garbage collector 320 is spread across the many nodes. For example, the garbage collector 320 on one node may take on the role of as a master, which tells garbage collectors running on other nodes which objects to analyze, such that the work (and therefore overhead) is spread out. In turn, the garbage collector 320 on a given node may do the analysis of one or more one object types. So node A might track objects of the type "java.lang.String," while node B tracks objects of the type "java.text.SimpleDateFormat," and so on. The garbage collector 320 running on each node 112 may collect specific information about the object types they are tracking, such as percentage of objects of this type that are long lived, average life time of an object, average life time of short lived objects of this type, average life time of long lived objects of this type, etc. The nodes then share this information to the master node, which then distributes the shared information back out to all of the nodes. The individual nodes can then use this information to optimize their garbage collection by immediately placing objects that are more likely to be long lived into the tenured space without having to process them multiple times in the nursery space.

As stated, garbage collector 320 running on one node (e.g., as a master) may be configured to transmit messages to garbage collectors 320 running on other nodes 112. In one embodiment, garbage collectors 320 may communicate using a message passing library such as the Message Passing Interface MPI library. In such as case, the MPI call of MPI_Send( ); may be used by application 320 to transmit a message from one compute node to another. On the other side of the communication, the receiving garbage collector 320 may use the MPI call of MPI_Receive( ); to receive and process the message. As described above, in a Blue Gene® system, the external data interface 304 may be configured to transmit the high level MPI message by encapsulating it within a set of packets and transmitting the packets of over the torus network of point-to-point links. Other parallel systems also include a mechanism for transmitting messages between different compute nodes. For example, nodes in a Beowulf cluster may communicate using a using a high-speed Ethernet style network. Similarly, large distributed or grid-type systems use message passing techniques (e.g., the MPI and ARMCI parallel libraries) to coordinate the processing activity of a block of compute nodes.

Figure 4:
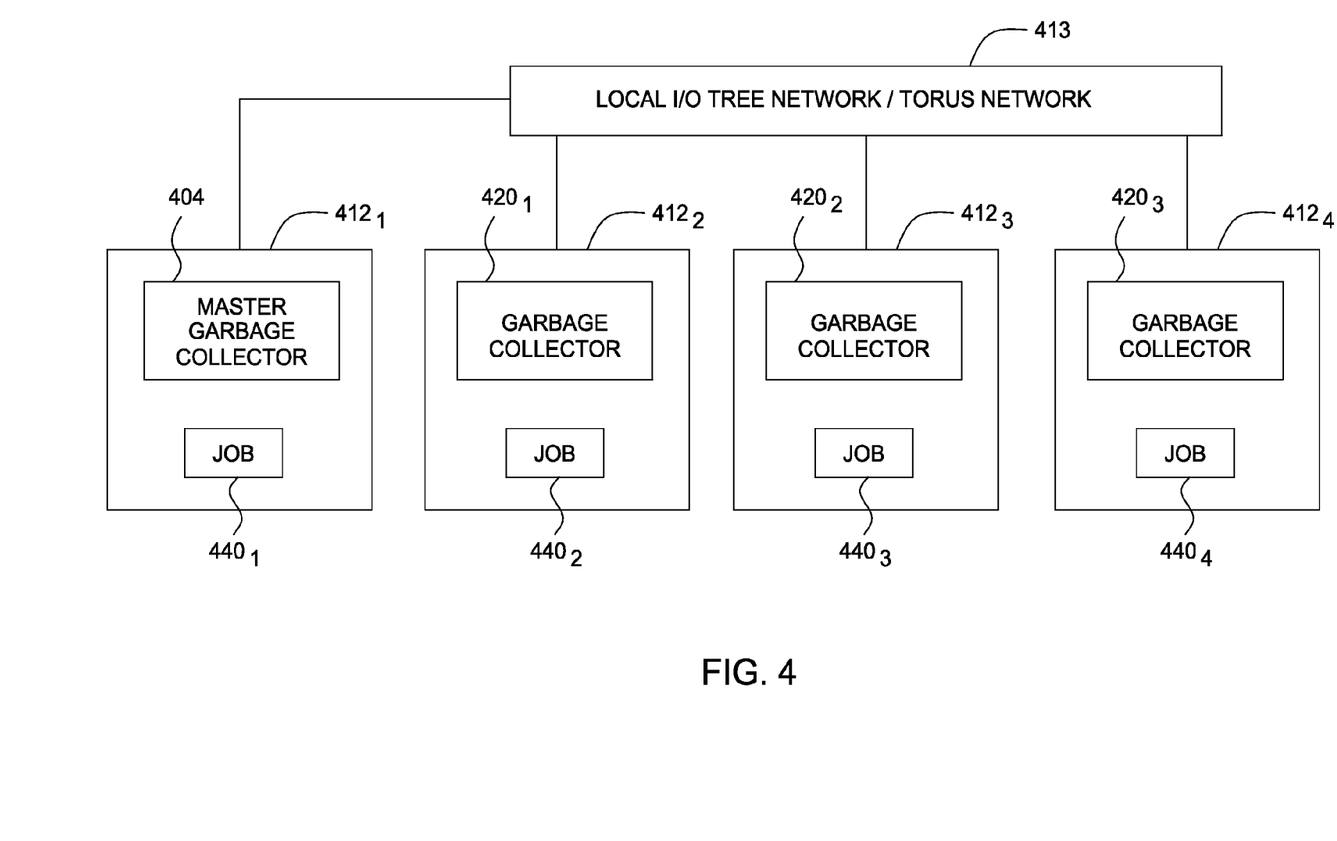
FIG. 4 is a block diagram of a system for enhanced garbage collection in a multi-node environment, according to one embodiment of the invention.

FIG. 4 is a block diagram of a system 400 for enhanced garbage collection in a multi-node environment 100, according to one embodiment of the invention. As shown, system 400 includes a local I/O tree and/or torus network 413 for data communication among a set of compute nodes $412_{1-4}$. Illustratively, compute node $412_1$ includes a master garbage collector 404, and nodes $412_{2-4}$ include a garbage collector $420_{1-3}$, the activity of which may be coordinated by master garbage collector 404. Also, each node $412_{1-4}$ is running job 440 in parallel. On each of the nodes 412, the corresponding garbage collector 404, 420 may be configured to free memory no longer referenced by objects in job 440. Additionally, by sharing information related to garbage collection among garbage collectors 404, $420_{1-3}$, garbage collectors 404, $420_{1-3}$ may reduce garbage collection overhead as well as improve garbage collection performance.

In one embodiment, master garbage collector 404 coordinates the efforts of the individual garbage collectors $420_{1-3}$. The individual garbage collectors 420 free memory for released objects. In some embodiments of the invention, garbage collectors 404, $420_{1-3}$ also track information about objects to facilitate enhanced garbage collection. For example, master garbage collector 404 may determine the object types (e.g., classes) for an application (e.g., job 440) and assign a subset of the object types for analysis to each of the garbage collectors $420_{1-3}$. Of course, the subset of object types for a given garbage collector may be the empty set. In other words, in some embodiments, some garbage collectors 420 may not be assigned any object types.

In one embodiment, garbage collectors 420 may be configured to collect statistics regarding what objects are created and released for assigned types in order to facilitate enhanced garbage collection. By tracking lifetime length of objects by type, garbage collectors 420 may more readily distinguish long-lived objects from short-lived objects. Thus, garbage collectors 420 may more readily predict when to evaluate a given object (or object type) for potential freeing. Being able to predict when to free memory allows garbage collectors 420 to reduce garbage collection overhead for their assigned types. Further, the individual garbage collectors 420 may share object creation and release statistics with the other garbage collectors 420 by sending the statistics in messages to the master garbage collector 404. In turn, the master garbage collector 404 may forward the messages to all other garbage collectors 420 so that all garbage collectors 420 may reduce garbage collection overhead for objects of all types.

Figure 5:
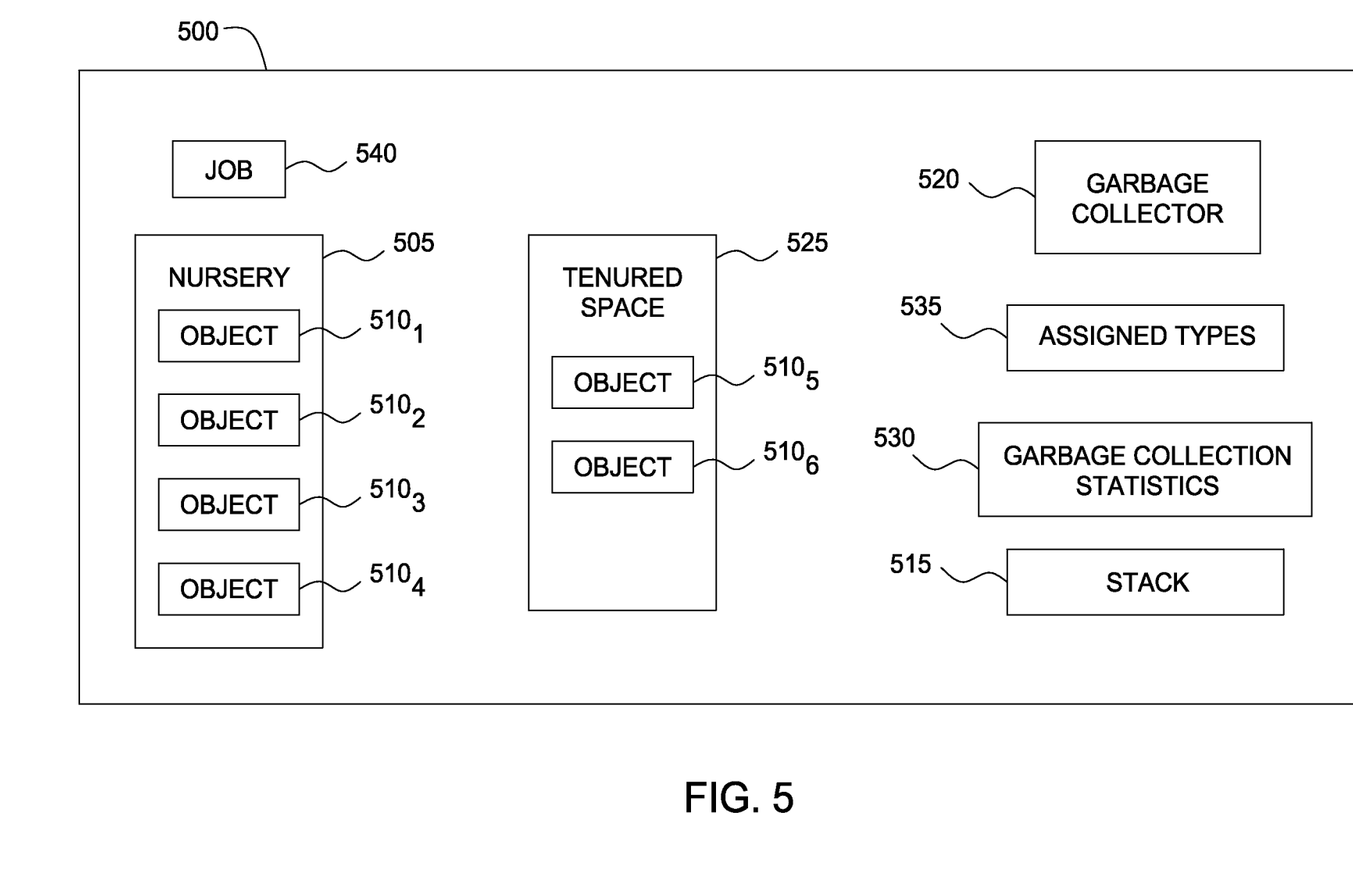
FIG. 5 illustrates a memory of a compute node in a system with enhanced garbage-collection functionality, according to one embodiment of the invention.

FIG. 5 illustrates a memory 500 of a compute node 112 in a system 100 with enhanced garbage-collection functionality, according to one embodiment of the invention. As shown, memory 500 includes a job 540, a garbage collector 520, a nursery 505, a tenured space 525, assigned types 535, garbage collection statistics 530, and stack 515.

The job 540 may be an object-oriented program that creates and releases objects 510 by allocating memory from memory 500. Illustratively, nursery 505 and tenured space 525 contains objects $510_{1-6}$. Each object in nursery 505 (objects $510_{1-4}$) and tenured space 525 (objects $510_{1-4}$) references an object created by job 540 in the course of performing a computing task. The objects in the object nursery 505 may be short-lived and the objects 510 in the tenured space 525 may be long-lived. In some embodiments, the garbage collector 520 creates references to object 510 in the object nursery 505 when the job 540 creates the object 510. As an object 510 persists in the nursery 505 during application execution, the garbage collector 520 may move a long-lived object from the nursery 505 to the tenured space 525. In some embodiments, the garbage collector 520 may determine whether an object 510 is long-lived or short-lived, and move the object to the appropriate object space at the time of object creation.

The assigned types 535 may be a data structure that describes all the object types that the master garbage collector 404 (described in FIG. 4) assigns to the garbage collector 520 for analysis. The statistics 530 may be a data structure that describes information relevant to determining whether an object 510 is likely to be long-lived or short-lived. This information may include, but is not limited to: average life time of an object, average life time of short-lived objects by type, average life time of long-lived objects by type, and percentage of objects that are long lived by type.

For example, a garbage collector 520 may distinguish long-lived objects from short-lived objects by average lifetime. Accordingly, if objects of type A have an average lifetime in excess of the average life time of short-lived objects, the job collector 520 may move objects of type A to the tenured space 535. Because objects in tenured space 525 are evaluated for collection less frequently, moving objects to tenured space 525 reduces the overhead of each garbage collection cycle. In another example, if a garbage collector 520 determines that 75% of objects 510 of type B are long-lived objects, the garbage collector 520 may place type B objects 510 in the tenured space 525 when any object of that type is created avoiding the initial cycles of having such an object in the nursery 505.

In one embodiment, garbage collector 520 may send statistics 530 to the master garbage collector 404, which then distributes the shared statistics 530 with other garbage collectors 520 on other compute nodes. The individual nodes can then optimize their garbage collection by using the statistics 530 to distinguish long-lived and short-lived objects, and placing objects that are more likely to be long lived into their respective tenured spaces.

In addition to object statistics 530, in one embodiment, garbage collector 520 may analyze what objects are present on the stack 515 when an object is created. In such a case, garbage collector 520 may read the stack 515 to see where an object 510 is created, e.g., within which application method of job 540. By analyzing which methods are creating objects 510, garbage collector 520 may be able to more selectively determine when objects 510 of a particular type are likely to be long-lived, and accordingly should be moved to the tenured space 525.

Typically, objects 510 of any given type may be created at several points in a job 540. However, it is likely that different objects 510 of the same type created in the same method may have similar life-cycle characteristics, which can also be considered in determining whether an object 510 is long-lived or short-lived. This information can again be passed to the master 404 and distributed to the rest of the garbage collectors 520. For example, instead of determining that 75% of all type B objects are long-lived, the garbage collector 520 can be more specific. The garbage collector 520 may be able to determine that 90% of type B objects are long-lived when created in method X, and 25% long-lived when created in other methods. In such a case, the garbage collector 520 moves type B objects 510 to the tenured space 525 when created in method X. In contrast, the garbage collector 520 may leave objects 510 of type B in the object nursery 505 when the object 510 created in other methods.

In one embodiment, garbage collection may be enhanced for batch applications, which typically execute in multiple phases. In an example batch application, the application may only work with a limited first set of objects in a first phase, and only a second set of objects in a second phase. In such a case, the application may release a large number of objects from the first set of objects when transitioning to the second phase. Accordingly, in one embodiment, garbage collectors 520 may be specialized to track en masse releases of objects 510. By detecting when an en masse release occurs, a specialized garbage collector 520 may signal other garbage collectors 520 to evaluate objects 510 before the released objects are detected in garbage collection cycles. By allowing garbage collectors 520 to identify large numbers of objects 510 which may be freed, garbage collection overhead can be further reduced by lessening the number of objects 510 analyzed in each garbage collection cycle.

Figure 6:
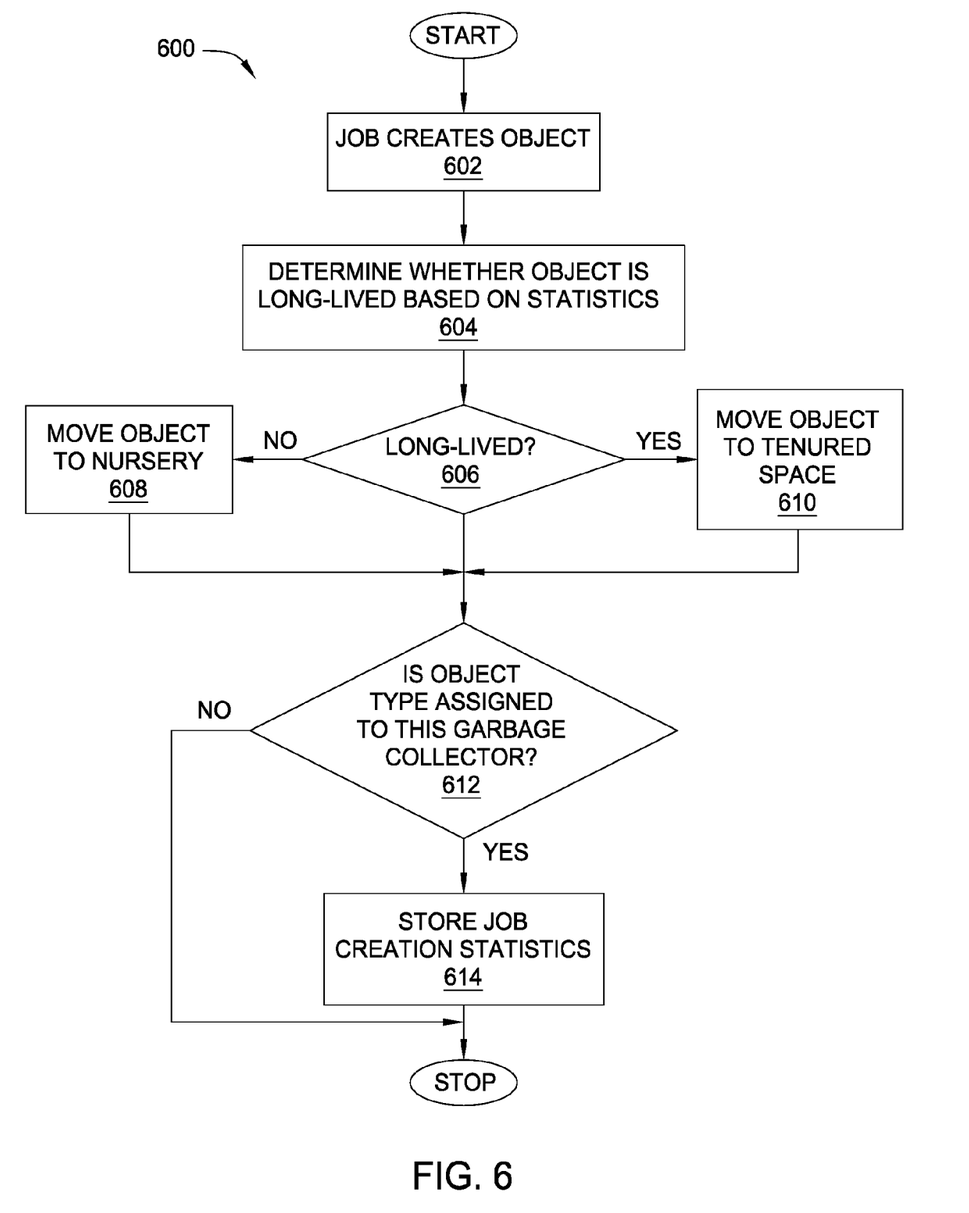
FIG. 6 depicts a flowchart of a process for creating new objects on a parallel system having enhanced garbage collection, according to one embodiment of the invention.

FIG. 6 depicts a flowchart of a process 600 for creating new objects on a parallel system having enhanced garbage collection, according to one embodiment of the invention. As shown, process 600 begins at step 602, wherein a job 540 for an object-oriented application creates a new object. At step 604, the garbage collector may determine whether the object is long-lived based on the shared garbage collection statistics. The determination may involve a variety of criteria, including, e.g., average life span of an object of this type, percentage of objects of this type that are long-lived, and percentage of objects of this type that are short-lived.

At step 606, if the object created at step 602 is not long-lived, the process continues to step 608, where the garbage collector 520 stores the object 510 to an object nursery. If the object created at step 602 is long-lived, at step 610, the garbage collector 520 may store the object in a tenured space. As is known, garbage collection is performed in cycles. During a cycle, the garbage collector may evaluate objects 510 to identify ones that may be freed (i.e., returned to memory available for allocation). The garbage collector performs the same function for objects in the tenured space, but in less frequent cycles.

At step 612, the garbage collector 520 may determine whether the object created at step 602 is of an assigned type 535. If the object 510 is not an assigned type 535, the process 600 ends. Otherwise, at step 614, the garbage collector may store job creation statistics in the garbage collection statistics 530. Job creation statistics may include, e.g., object type, date and time of object creation, and name of method that creates the object. The process 600 then ends.

Figure 7:
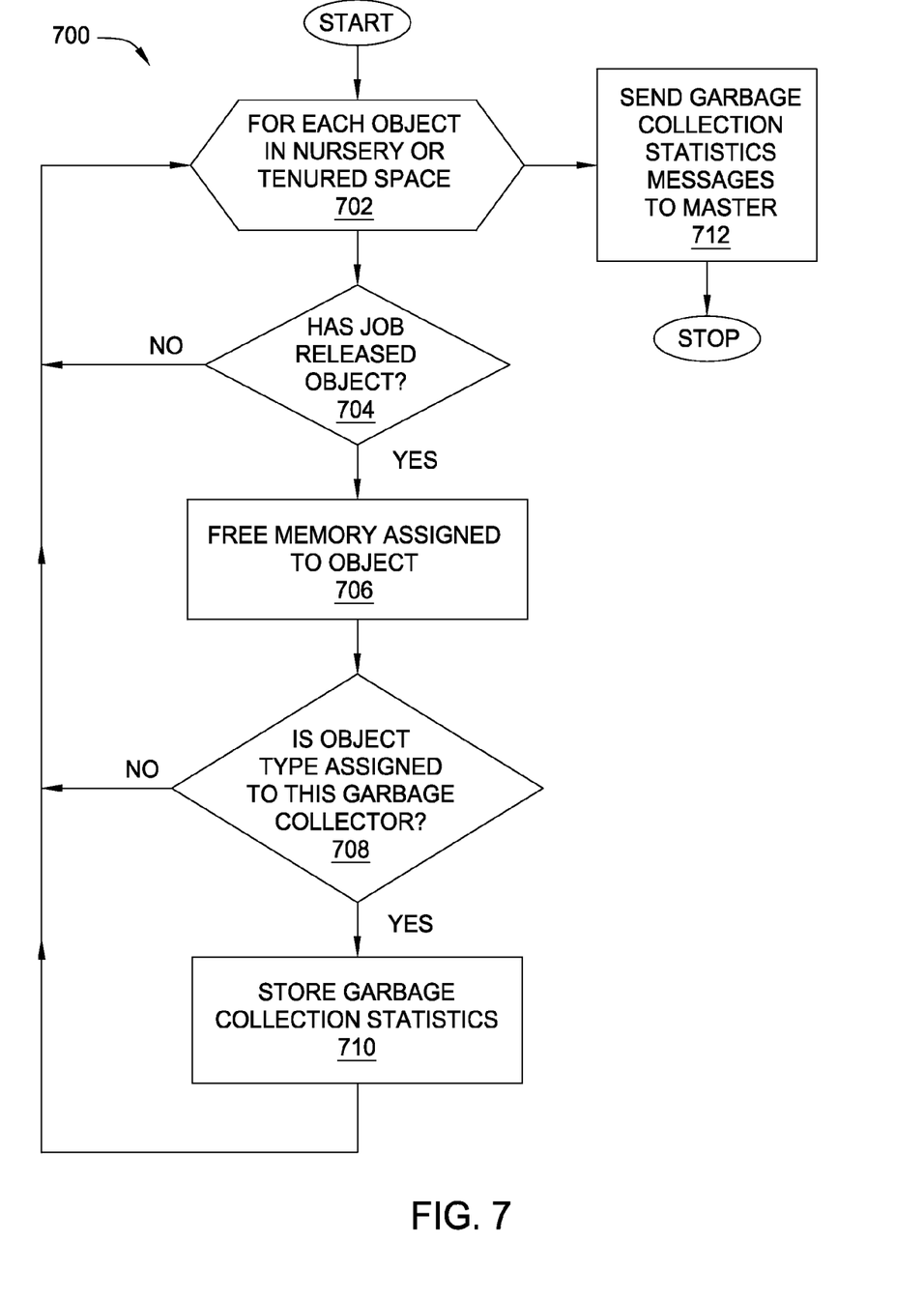
FIG. 7 is a flowchart illustrating a process for a garbage collection cycle during enhanced garbage collection, according to one embodiment of the invention.

FIG. 7 is a flowchart illustrating a process 700 for a garbage collection cycle performed by a garbage collector, according to one embodiment of the invention. The process 700 describes garbage collection cycles for both the nursery 505, and the tenured space 525, which are referred to collectively as object spaces.

As shown, the process 700 begins at step 702. Process 702 shows a loop performed for each object 510 in an object space, including steps 704, 706, 708 and 710. At step 704, the garbage collector may determine whether a computing job still includes an active reference to the object 510, i.e., the garbage collector may determine whether the object is reachable by any object reference in the computing job. If so, the loop 702 repeats for the next object in the object space. If the computing job does not include any active references, or is not reachable by any active object in the computing job, at step 706, the garbage collector frees the memory allocated to the object. That is, the memory allocated to the object is returned to a pool available for object allocation by the computing job. At step 708, the garbage collector determines whether the object being evaluated is of a type assigned for the garbage collector to analyze. If not, the loop 702 repeats for the next object in the object space. Otherwise, if the object is of an assigned type, at step 710, the garbage collector 520 stores garbage collection statistics related to the object being evaluated this pass through the loop. Garbage collection statistics 530 may include, e.g., a classification of the object as long-lived or short-lived, object release time, and length of object lifetime.

At the conclusion of the garbage collection cycle, the garbage collector may send a message to the master garbage collector with the garbage collection statistics from the most recent garbage collection cycle. In turn, the master garbage collector may distribute this information to other compute nodes running the same application.

Advantageously, embodiments of the invention enhance a garbage collection process running on a parallel system or distributed computing environment. Using a garbage collector in such an environment allows a more in-depth analysis to be performed than is possible on other systems. This is because the number of compute nodes present in many parallel systems, and the connections between them, allows the overhead of doing advanced analysis to be spread across the nodes and the results of that analysis to be shared among the nodes.

While the foregoing is directed to embodiments of the present invention, other and further embodiments of the invention may be devised without departing from the basic scope thereof, and the scope thereof is determined by the claims that follow.

What is claimed is:

1. A method of performing a garbage collection cycle on a parallel computing system having a plurality of compute nodes each running an instance of a computing job and a garbage collector, comprising:
   identifying, by the instance of the garbage collector running on each of the plurality of compute nodes, an object space in a memory of a respective compute node, wherein the object space stores one or more objects allocated by the instance of the computing job running on the respective compute node;
   evaluating each object in the object space to determine whether the memory allocated to each respective object is eligible to be collected;
   upon determining that the memory allocated to a given object is eligible to be collected, removing the given object from the object space and returning memory allocated to the given object to a pool;
   determining a set of garbage collection statistics associated with at least one evaluated object in the object space; and
   transmitting the set of garbage collection statistics to a master garbage collector running on a compute node of the parallel computing system, wherein the master garbage collector distributes the transmitted set of garbage collection statistics received from the garbage collector on each respective compute node to the instance of the garbage collector running on the other compute nodes, of the plurality and wherein the master garbage collector running on the compute node is configured to assign one or more object types to the garbage collectors running on the respective compute nodes, wherein the garbage collector running on the respective compute nodes determine the set of garbage collection statistics for the assigned types.

2. The method of claim 1, wherein the object space is a nursery configured to store objects predicted to be short-lived during an execution of the computing job.

3. The method of claim 2, further comprising, upon determining that the given object is not eligible to be collected, evaluating whether to move the object from the nursery to a tenured space configured to store objects predicted to be long-lived during the execution of the computing job.

4. The method of claim 1, wherein the object space is a tenured space configured to store objects predicted to be long-lived during an execution of the instance of the computing job running on the respective compute nodes.

5. The method of claim 4, further comprising, upon determining that the given object is not eligible to be collected, evaluating whether to move the object from the tenured space to a nursery configured to store objects predicted to be short-lived during the execution of the computing job.

6. The method of claim 1, wherein the garbage collection statistics are related to an object type associated with the at least one evaluated object, and wherein the garbage collection statistics specify one of an average life span of objects of the object type, percentage of objects of the object type that are long-lived, and percentage of objects of the object type that are long-lived.

7. A non-transitory computer-readable storage medium containing a garbage collector program which, when executed on each of a plurality of compute nodes of a parallel computing system, performs an operation of performing a garbage collection cycle on the parallel computing system, the operation comprising:
   identifying, by the instance of the garbage collector running on each of the plurality of compute nodes, an object space in a memory of a respective compute node, wherein the object space stores one or more objects allocated by the instance of the computing job running on the respective compute node;
   evaluating each object in the object space to determine whether the memory allocated to each respective object is eligible to be collected;
   upon determining that the memory allocated to a given object is eligible to be collected, removing the given object from the object space and returning memory allocated to the given object to a pool;
   determining a set of garbage collection statistics associated with at least one evaluated object in the object space; and
   transmitting the set of garbage collection statistics to a master garbage collector running on a compute node of the parallel computing system, wherein the master garbage collector distributes the transmitted set of garbage collection statistics received from the garbage collector on each respective compute node to the instance of the garbage collector running on the other compute nodes, of the plurality and wherein the master garbage collector running on the compute node is configured to assign one or more object types to the garbage collectors running on the respective compute nodes, wherein the garbage collector running on the respective compute nodes determine the set of garbage collection statistics for the assigned types.

8. The computer-readable storage medium of claim 7, wherein the object space is a nursery configured to store objects predicted to be short-lived during an execution of the computing job.

9. The computer-readable storage medium of claim 8, wherein the operation further comprises, upon determining that the given object is not eligible to be collected, evaluating whether to move the object from the nursery to a tenured space configured to store objects predicted to be long-lived during the execution of the computing job.

10. The computer-readable storage medium of claim 7, wherein the object space is a tenured space configured to store objects predicted to be long-lived during an execution of the instance of the computing job running on the respective compute nodes.

11. The computer-readable storage medium of claim 10, wherein the operation further comprises, upon determining that the given object is not eligible to be collected, evaluating whether to move the object from the tenured space to a nursery configured to store objects predicted to be short-lived during the execution of the computing job.

12. The computer-readable storage medium of claim 7, wherein the garbage collection statistics are related to an object type associated with the at least one evaluated object, and wherein the garbage collection statistics specify one of an average life span of objects of the object type, percentage of objects of the object type that are long-lived, and percentage of objects of the object type that are long-lived.

13. A parallel computing system, comprising:
a plurality of compute nodes, each having at least a processor and a memory, wherein the each of the plurality of compute nodes is configured to execute a parallel computing task, and wherein a garbage collector running on each of the plurality of compute nodes is configured to:
identify an object space in a memory of a respective compute node, wherein the object space stores one or more objects allocated by the parallel computing task job running on the respective compute node;
evaluate each object in the object space to determine whether the memory allocated to each respective object is eligible to be collected;
upon determining that the memory allocated to a given object is eligible to be collected, remove the given object from the object space and return memory allocated to the given object to a pool;
determine a set of garbage collection statistics associated with at least one evaluated object in the object space; and
transmit the set of garbage collection statistics to a master garbage collector running on a compute node of the parallel computing system, wherein the master garbage collector distributes the transmitted set of garbage collection statistics received from the garbage collector on each respective compute node to the instance of the garbage collector running on the other compute nodes, of the plurality and wherein the master garbage collector running on the compute node is configured to assign one or more object types to the garbage collectors running on the respective compute nodes, wherein the garbage collector running on the respective compute nodes determine the set of garbage collection statistics for the assigned types.

14. The system of claim 13, wherein the object space is a nursery configured to store objects predicted to be short-lived during an execution of the computing job.

15. The system of claim 14, wherein the garbage collector running on each respective compute node is further configured to, upon determining that the given object is not eligible to be collected, evaluate whether to move the object from the nursery to a tenured space configured to store objects predicted to be long-lived during the execution of the computing job.

16. The system of claim 13, wherein the object space is a tenured space configured to store objects predicted to be long-lived during an execution of the computing job.

17. The system of claim 16, wherein the garbage collector running on the first compute node is further configured to, upon determining that the given object is not eligible to be collected, evaluate whether to move the object from the tenured space to a nursery configured to store objects predicted to be short-lived during the execution of the computing job.

18. The system of claim 13, wherein the garbage collection statistics are related to an object type associated with the at least one evaluated object, and wherein the garbage collection statistics specify one of an average life span of objects of the object type, percentage of objects of the object type that are long-lived, and percentage of objects of the object type that are long-lived.

* * * * *